United States Patent [19]

Waddill et al.

[11] 4,146,700
[45] Mar. 27, 1979

[54] DIAMIDES OF POLYOXYALKYLENEPOLYAMINE-UREA CONDENSATES AS EPOXY RESIN ADDITIVES

[75] Inventors: Harold G. Waddill; Heinz Schulze, both of Austin, Tex.

[73] Assignee: Texaco Development Corp., New York, N.Y.

[21] Appl. No.: 890,333

[22] Filed: Mar. 27, 1978

[51] Int. Cl.$^2$ .................................................. C08G 59/46
[52] U.S. Cl. ........................................ 528/94; 260/830 R; 528/88; 528/93; 528/111; 528/135; 528/367
[58] Field of Search .................. 260/830 R, 553 R; 528/111, 135, 407, 367, 88, 93, 94

[56] References Cited

U.S. PATENT DOCUMENTS

| | | | |
|---|---|---|---|
| 3,462,393 | 8/1969 | Legler | 260/47 |
| 3,557,056 | 1/1971 | Peerman | 260/47 |
| 3,645,969 | 2/1972 | Harvey | 260/47 EN |
| 4,002,598 | 1/1977 | Waddill et al. | 260/47 EN |

Primary Examiner—Harold D. Anderson
Assistant Examiner—E. A. Nielsen
Attorney, Agent, or Firm—Carl G. Ries; Thomas H. Whaley; Kenneth R. Priem

[57] ABSTRACT

The adhesion properties of amine-cured epoxy resins are unexpectedly enhanced by addition of certain diamides of polyoxyalkylenepolyamine-urea condensates. The adhesively superior epoxy resin composition comprises a vicinal polyepoxide, a curing amount of an amine curing agent, and an effective amount of a diamide of a polyoxyalkylenepolyamine-urea condensate having a molecular weight of from 4000 to about 4500.

20 Claims, No Drawings

DIAMIDES OF POLYOXYALKYLENEPOLYAMINE-UREA CONDENSATES AS EPOXY RESIN ADDITIVES

BACKGROUND OF THE INVENTION

1. Field of the Invention

This invention relates to curable epoxy resins having increased adhesive strength; and, more particularly, to amine cured epoxy resins containing certain diamide additives.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents are generally the amines. The most commonly used amine curing agents are aliphatic amines such as diethylenetriamine, triethylenetetramine and the like and/or polyoxyalkylene polyamines; such as polyoxypropylenediamines and triamines.

Epoxy resin compositions having improved physical properties are obtained by employing polyoxyalkyleneamines, and polyoxyalkylenediamines in particular, as curing agents. It is common to employ with such epoxy resin compositions a co-curing agent such as those described in U.S. Pat. No. 3,549,592.

Also known to be effective as epoxy curing agents or co-curing agents are various ureas and substituted ureas, such as those disclosed in U.S. Pat. Nos. 3,294,749, 2,713,569, 3,386,956, 3,386,955, 2,855,372 and 3,639,338. The ureas disclosed in the above references are useful as either curing agents or as curing accelerators.

Aliphatic or aromatic compounds having a single terminal ureido group are well known. It has been disclosed in U.S. Pat. No. 2,145,242 to Arnold that di-ureido terminated aliphatic compounds can be produced by reacting an aliphatic diamine wherein each terminal amine has at least one labile hydrogen with urea. Other substituted ureas are disclosed in U.S. Pat. No. 3,965,072.

Diureido terminated polyoxyalkylene material provides cured epoxy resin compositions exhibiting outstanding strength of adhesion as disclosed in our co-pending application Ser. No. 743,814 filed Nov. 22, 1976.

It has been surprisingly discovered that cured epoxy resins having outstanding tensile shear strength can be obtained by using an additive comprising diamides of polyoxyalkylenepolyamine-urea condensates. The cured epoxy resin compositions of the instant invention are useful as coatings, castings, sealants and especially adhesives.

SUMMARY OF THE INVENTION

According to the broad aspect of the instant invention, the adhesive strength of amine-cured epoxy resins is enhanced by the addition of an effective amount of a diamide of a polyoxyalkylenepolyamine-urea condensate having a molecular weight of from 4000 to about 4500.

In one aspect, a curable epoxy resin composition having superior adhesive strength comprises a vicinal polyepoxide, a curing amount of an amine curing agent and an effective amount of the diamide additive.

In accordance with a preferred embodiment, a diglycidyl ether of 4,4'-isopropylidene bisphenol, a curing amount of a primary amine-containing curing agent consisting essentially of a polyoxypropylene polyamine having a molecular weight of from about 200 to 500 and an effective amount of a diamide of a polyoxyalkylenepolyamine-urea condensate having a molecular weight of about 4000 are utilized to form a resin.

DETAILED DESCRIPTION OF THE INVENTION

According to the instant inventive concept, blends of a polyepoxide, an amine curing agent and a diamide of a polyoxyalkylenepolyamine-urea condensate and, optionally, an accelerator are thoroughly admixed and cured in accordance with conventional methods to provide cured epoxy resins having unexpectedly superior adhesive strength.

Generally the vicinal polyepoxide containing compositions which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isoporpylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexy)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers. e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g, sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The amine curing agents which can be utilized in accordance with the instant invention are generally any of those amine curing agents which are well known to be useful for the curing of vicinal epoxides. Generally, those curing agents having at least three reactive amino hydrogens are useful.

Exemplary of those amines which can be utilized are alkylene polyamines such as diethylene triamine, triethylene tetramine and the like; oxyalkylene polyamines such as polyoxypropylene, di- and triamine and diamino derivatives of ethylene glycol, such as 1,13-diamino 4, 7,10-trioxatridecane.

Additionally, aromatic amine curing agents are useful, such as the alkylene-linked polyphenyl amines, phenylene diamines and polycyclic or fused aromatic primary amine compounds. Additionally the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

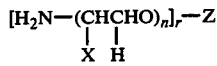

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylene diamines wherein X is a methyl radical, n is a number from 1 to 10, Z is a 1,2-propylene radical and r is about 2. These polyoxyalkylene polyamines can be prepared by known methods as disclosed in U.S. Pat. Nos. 3,236,895 and 3,654,370.The most preferred polyoxyalkylene polyamine is a polyoxypropylene diamine having a molecular weight of about 230.

Another preferred class of polyoxyalkylene polyamines can be depicted by the formula:

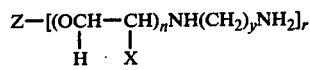

wherein X, Z n and r are defined as above and y is 2 or 3.These poly(aminoalkylamino)polyethers are the hydrogenated product of the cyanoalkylated adduct of a polyoxyalkylene polyamine as above described. The preparation of the cyanoalkylatedadducts is described in U.S. Pat. No. 3,666,788 issued to Rowton, May 30, 1972.

The diamide of a polyoxyalkylenepolyamine-urea condensate additive can generally be depicted by the formula:

X(NHZ-NHX-R')$_2$ wherein R' is an alkyl radical, an aryl radical or hydrogen,
and
X is a C=O or a C=S radical,
and
Z is a polyoxyalkylene radical of molecular weight ranging from about 1,800 to 2,300.

The diamides of polyoxypolyamine-urea condensates are formed by the reaction of a carboxylic acid or a derivative thereof with a polyoxyalkylene polyamine-urea condensate having a molecular weight value such that the diamide product has a molecular weight of from about 4,000 to about 4,500. The polyoxyalkylenepolyamine-urea condensate is formed, for example, by the reaction of about 2 moles of a polyoxyalkylene diamine for each mole of urea.

The diamines that are useful in forming the additives are polyoxyalkylene diamines of the formula:

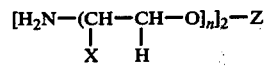

wherein X is a hydrogen, a methyl radical or an ethyl radical; Z is a hydrocarbon alkylene radical having from 2 to 5 carbon atoms; and, n is an average number of from about 15 to about 25. Preferred polyoxypropylene diamins wherein X is a methyl radical, n is an average number from 16 to 19, Z is a 1,2-propylene radical. These polyoxyalkylene polyamines can be prepared by known methods as disclosed in U.S. Pat. Nos. 3,236,895 and 3,654,370.

In accordance with this method, the reactants are simply admixed in correct molar ratios is a suitable reaction vessel and heated, if necessary, until the reaction occurs.

Optionally, the epoxy resin formulations of the instant invention can include an "accelerator" to speed the amine cure of the epoxy resin, especially at ambient temperatures. In several applicatins, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7–14 describes the use of certain amine-containing componds as epoxy curing agent-accelerators.

Many accelerators are known in the art which can be utilized in accordance with the instant invention. Examples include salts of phenols; salicyclic acids; amine salts of fatty acids such as those disclosed in U.S. Pat. No. 2,681,901; and tertiary amines such as those disclosed in U.S. Pat. No. 2,839,480. A preferred accelerator in accordance with the instant invention is disclosed in U.S. Pat. No. 3,875,072 issued to G. Waddill, Apr. 1, 1975. The accelerator comprises a combination of piperazine and an alkanol amine in a weight ratio of about 1:8 to 1:1.

According to the method of the instant invention, the adhesion properties of prior art amine-cured epoxy resins are enhanced by the addition of an effective amount of a diamide of a polyoxyalkylenepolyamine-urea condensate having a molecular weight of from about 4,000 to about 4,500 as hereinbefore described. The amount of additive effective in bringing about the increased adhesive property is somewhat empirical and will depend upon the resin, the amine curing agent, and the use of an accelerator. Generally, the diamide additive can be utilized in amounts from about 2 to about 50 parts by weight based on one hundred parts by weight of the resin constituent.

Preferably the adhesive properties of prior art resins are enhanced by addition of an effective amount of the diamide additive based upon the condensation of 2 moles polyoxyalkylenediamine with 1 mole of urea. The preferred resins comprise polyglycidyl ethers of a polyhydric phenol cured by incorporating therein a curing amount of a polyoxyalkylenepolyamine of molecular weight from about 200 to 500 and, optionally, an accelerator combination of piperazine and an alkanolamine, the combination having a combined weight ratio of between about 1:8 to 1:1. Exemplary preferred prior art compositions can be enhanced in accordance with the instant invention are disclosed in U.S. Pat. No. 3,943,104 issued Mar. 9, 1976 to G. Waddill.

The amine cured resins having superior adhesion in accordance with the instant invention are prepared in a conventional manner. The amine curing agent is admixed with the polyepoxide composition in amounts according to the amine equivalent weight of the curing agent employed. Generally the number of equivalents of amine groups is from about 0.8 to about 1.2 times the number of epoxide equivalents present in the curable epoxy resin composition, with a stoichiometric amount being preferred. When using an accelerator, amounts from 1 to about 10 parts by weight based on 100 parts by weight of the resin are generally satisfactory. The exact amount of constituents in accordance with the above general requirements will depend primarily on the application for which the cured resin is intended.

The diamide additive is incorporated into the uncured resin by admixing. Preferably, the additive is first admixed with the curing agent and/or the accelerator prior to addition to the resin. The constituents forming the curable material are then intimately admixed by standard methods and degassed in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material, especially the adhesive strength.

Preferred amine curing agents are those polyamines having amine equivalent weight of from 20 to about 150. Examples of such agents include polyoxypropylenediamines having a molecular weight in the range of 200 to 500 and polyoxypropylenepolyamines having a molecular weight of from about 400 to 700.

Generally, the mixture of epoxy resin, the diamide additive, polyoxyalkylene polyamine, and (optionally) the accelerator combination of piperazine and alkanolamine is allowed to self-cure at ambient temperatures of between 0° C. to about 45° C. However, it has been found expeditious that the mixture be cured or postcured at elevated temperatures of up to about 135° C.

It will further be realized that various conveniently employed additives can be admixed with the polyepoxide containing composition of the instant invention prior to final cure. For example, in certain instances it may be desired to add minor amounts of other polyalkyleneamine co-catalysts as herein described, or hardeners along with various other accelerators and curing agent systems well known in the art.

Additionally, conventional pigments, dyes, fillers, flame retarding agents and the like which are compatible, natural or synthetic resins can be added.

Furthermore, although not preferred, known solvents for polyepoxide materials such as toluene, benzene, xylene, dioxane, ethylene glycol monomethylether and the like can be used. The polyepoxide resins containing the additives of the instant invention can be used in any of the above applications for which polyepoxides are customarily used. The compositions of the instant invention can be used as impregnants, surface coatings, pottings, capsulating compositions, laminates, and, particularly and most importantly, as adhesives for bonding metallic elements or structures permanently together.

The following examples illustrate the nature of the instant invention but are not intended to be limitative thereof.

EXAMPLE 1

This example demonstrates the preparation of a diamide(bisformamide) of a polyoxyalkylenediamine-urea condensate of about 4000 molecular weight. Initially a product, which is polyoxypropylene diamine of about 2000 molecular weight condensed with urea in a 2:1 molar ratio (such as JEFFAMINE® DU-3000 from Jefferson Chemical Co.), is reacted to form a diamide as follows:

A mixture of JEFFAMINE® DU-3000 (0.52 meq./g. primary amine; 1331 g (0.31 moles), toluene (122 g.) and 90% formic acid (47 g., 0.92 moles) was heated at reflux and with stirring under nitrogen. An aqueous phase (20.6 g.) was removed in a Dean-Stark trap. The product was stripped under vacuum (115°–170° C./10MM). The liquid product analyzed as follows: total amine 0.02 meq./g., total acetylatables 0.12 meq./g.

EXAMPLE 2

This example demonstrates the preparation of a diamide(bisbenzamide) of a polyoxyalkylene diamine-urea condensate of about 4000 molecular weight. JEFFAMINE® DU-3000 is reacted to form a diamide as follows:

A mixture of JEFFAMINE® DU-3000 (0.52 meq./g. primary amine, Bis(Benzamide) 14–20 g., 0.33 moles), toluene (100 g.) and benzoic acid (80 g., 0.66 mole) was heated at reflux (156°–220° C.) while the aqueous phase was collected in a Dean-Stark trap. The product was stripped under vacuum (195°-216° C./2MM). The product analyzed as follows — total amine 0.24 meq./g., primary amine 0.23 meq./g., total acetylatables 0.27 meq./g.

EXAMLE 3

This example shows properties of an epoxy resin cured with blends of a polyoxypropylenepolyamine of about 230 molecular weight (JEFFAMINE ® D-230) referred to as "curative" and the Bis(formamide) of Example 1.

|  | A | B | C | D | E |
|---|---|---|---|---|---|
| Amt. of Bis(formamide) phr. | 0 | 2 | 5 | 10 | 20 |
| Amt. of curative, phr. | 30 | 30 | 30 | 30 | 30 |
| Tensile shear strength*, psi. | 980 | 1390 | 2270 | 3590 | 2980 |
| Peel strength*, pli. | 7.6 | 7.0 | 8.1 | 15.9 | 23.2 |

*Bond: Aluminum to Aluminum
Cure: 7 days, about 25° C. Common for all examples

EXAMPLE 4

This example shows properties of an epoxy resin cured with blends of a polyoxypropylenepolyamine of about 400 molecular weight (JEFFAMINE ® D-400) referred to as "curative" and the Bis(formamide) of Example 1.

|  | A | B | C | D |
|---|---|---|---|---|
| Amt. of Bis(formamide) phr. | 0 | 2 | 5 | 10 |
| Amt. of curative, phr. | 50 | 50 | 50 | 50 |
| Tensile shear strength | 2500 | 3480 | 2900 | 2800 |

EXAMPLE 5

This example shows properties of an epoxy resin cured with blends of a polyoxypropylenetriamine of about 400 molecular weight (JEFFAMINE ® T-403) referred to as "curative" and the Bis(formamide) of Example 1.

|  | A | B | C | D |
|---|---|---|---|---|
| Amt. of Bis(formamide), phr | 0 | 2 | 5 | 10 |
| Amt. of curative, phr. | 45 | 45 | 45 | 45 |
| Tensile shear strength, psi | 1400 | 1500 | 2500 | 3080 |

EXAMPLE 6

This example shows properties of an epoxy resin cured with blends of triethylenetetramine and the Bis(formamide) of Example 1.

|  | A | B | C | D |
|---|---|---|---|---|
| Amt. of Bis(formamide) phr. | 0 | 2 | 5 | 10 |
| Amt. of curative, phr. | 12 | 12 | 12 | 12 |
| Tensile shear strength, psi | 800 | 1170 | 2120 | 2430 |

EXAMPLE 7

This example shows properties of an epoxy resin cured with blends of diethylene glycol Bis(propylamine) and the diamide of Example 1.

|  | A | B | C | D |
|---|---|---|---|---|
| Amt. of Bis(formamide), phr | 0 | 2 | 5 | 10 |
| Amt. of curative, phr. | 30 | 30 | 30 | 30 |
| Tensile shear strength, psi | 1570 | 2150 | 3370 | 3550 |

EXAMPLE 8

This example shows properties of an epoxy resin cured with blends of JEFFAMINE ® D-230 (curative of Example 3) and the diamide of Example 2.

|  | A | B | C | D |
|---|---|---|---|---|
| Amt. of Bis(Benzamide), phr | 0 | 5 | 10 | 20 |
| Amt. of curative, phr. | 30 | 30 | 30 | 30 |
| Tensile shear strength, psi | 980 | 2690 | 3920 | 3740 |
| Peel strength, pli | 7.6 | 6.5 | 16.2 | 25.5 |

EXAMPLE 9

This example shows properties of an epoxy resin cured with blends of JEFFAMINE ® T-403 (curative of Example 5) and the diamide of Example 2.

|  | A | B | C |
|---|---|---|---|
| Amt. of Bis(Benzamide), phr | 0 | 10 | 20 |
| Amt. of curative, phr | 50 | 50 | 50 |
| Tensile shear strength, psi | 2500 | 2700 | 2350 |

EXAMPLE 10

This example shows properties of an epoxy resin cured with blends of JEFFAMINE ® T-403 (curative of Example 5) and the diamide of Example 2.

|  | A | B | C |
|---|---|---|---|
| Amt. of Bis(Benzamide), phr | 0 | 10 | 20 |
| Amt. of curative, phr. | 45 | 45 | 45 |
| Tensile shear strength, psi | 1400 | 3540 | 3430 |

EXAMPLE 11

This example shows properties of an epoxy resin cured with blends of triethylenetetramine (curative) and the diamide of Example 2.

|  | A | B | C |
|---|---|---|---|
| Amt. of Bis(Benzamide), phr | 0 | 10 | 20 |
| Amt. of curative, phr. | 12 | 12 | 12 |
| Tensile shear strength, psi | 800 | 1940 | 2050 |

EXAMPLE 12

This example shows properties of an epoxy resin cured with blends of the curative diethyleneglycol Bis (propylamine) and the diamide of Example 2.

|  | A | B | C |
|---|---|---|---|
| Amt. of Bis(Benzamide), phr | 0 | 10 | 20 |
| Amt. of curative, phr. | 30 | 30 | 30 |
| Tensile shear strength, psi | 1570 | 3890 | 3340 |

We claim:
1. An epoxy resin composition having superior adhesion properties and being the cured product of a curable admixture which comprises:

a vicinal polyepoxide having an average of at least 1.8 reactive, 1,2-epoxy groups per molecule;

a curing amount of a polyamine curing agent having at least 3 reactive amino hydrogens; and, an effective amount of an additive consisting essentially of a diamide of a polyoxyalkylenepolyamine-urea condensate having a molecular weight of from about 4000 to about 4500.

2. The composition of claim 1 further comprising an effective amount of a composition effective in accelerating the cure.

3. The composition of claim 1 wherein said polyamine curing agents are of the formula

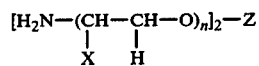

wherein X is a hydrogen, a methyl radical or an ethyl radical; Z is a hydrocarbon alkylene radical having from 2 to 5 carbon atoms; and, n is an average number of from about 2 to about 15.

4. The composition of claim 3 wherein X is a methyl radical.

5. The composition of claim 1 wherein the diamide is of the formula:

wherein R' is an alkyl radical, an aryl radical or hydrogen, X is a C=O or a C=S radical and Z is a polyoxyalkylene radical of molecular weight ranging from about 1800 to 2300.

6. The composition of claim 5 wherein X is a C=O radical.

7. The composition of claim 1 wherein said vicinal polyepoxide is more than 80% by weight of a polyglycidyl ether of polyhydric phenols.

8. The composition of claim 7 wherein said vicinal polyepoxide is a polyglycidyl ether of a polyhydric phenol.

9. A method for increasing the adhesive strength of an epoxy resin composition, being the cured product of a curable admixture comprising a vicinal polyepoxide having an average of at least 1.8 reactive, 1,2-epoxy groups per molecule; and, a curing amount of a polyamine curing agent having at least 3 reactive amino hydrogens comprising the step of:

adding to said curable admixture an effective amount of a diamide of a polyoxyalkylenepolyamine-urea condensate having a molecular weight of from about 4000 to 4500.

10. The method of claim 9 wherein said diamide is of the formula

wherein R' is an alkyl radical, an aryl radical or hydrogen, X is a C=O or a C=S radical and Z is a polyoxyalkylene radical of molecular weight ranging from about 1800 to 2300.

11. The method of claim 10 wherein R' is hydrogen.

12. The method of claim 10 wherein R' is a lower alkyl radical selected from the group consisting of methyl ethyl, n-propyl and n-butyl.

13. The method of claim 10 wherein said curable admixture further comprises an effective amount of a composition effective in accelerating the cure.

14. The method of claim 10 wherein said vicinal polyepoxide is more than 80% by weight of a polyglycidyl ether of polyhydric phenols.

15. The method of claim 14 wherein said vicinal polyepoxide is a polyglycidyl ether of a polyhydric phenol.

16. A curable resin composition comprising a diglycidyl ether of 4,4'-isopropylidene bisphenol polyepoxide; a curing amount of a primary amine-containing curing agent consisting essentially of a polyoxypropylene diamine having a molecular weight of from about 200 to 250 and, an effective amount of a diamide of a polyoxyalkylenepolyamine-urea condensate additive having a molecular weight of about 4000.

17. The resin of claim 16 wherein said primary amine-containing curing agent is present in about a stoichiometric amount and said additive is present in amounts from about 2 to 40 parts by weight based on 100 parts by weight of said polyepoxide.

18. In an epoxy resin composition, being the cured product of a curable admixture comprising a vicinal polyepoxide having an average of at least 1.8 reactive, 1,2-epoxy groups per molecule; and, a curing amount of a polyamine curing agent having at least 3 reactive amino hydrogens, the improvement which comprises:

increasing the adhesion properties of said cured product by addition of an effective amount of a diamide of a polyoxyalkylenepolyamine-urea condensate having a molecular weight of from about 4000 to 4,500.

19. The method of claim 18 wherein said diamide is of the formula:

wherein R' is an alkyl radical, an aryl radical or hydrogen, X is a C=O or a C=S radical and Z is a polyoxyalkylene radical of molecular weight ranging from about 1800 to 2300.

20. As an additive for increasing the adhesive strength of an amine cured epoxy resin, a composition of the formula:

wherein R' is an alkyl radical, an aryl radical or hydrogen, X is a C=O or a C=S radical and Z is a polyoxyalkylene radical of molecular weight ranging from about 1800 to 2300.

* * * * *